United States Patent

Fisher

(10) Patent No.: US 8,156,960 B2
(45) Date of Patent: Apr. 17, 2012

(54) SERVO PRESSURE CONTROL VALVE

(75) Inventor: Cory L. Fisher, Bradford, IL (US)

(73) Assignee: Caterpillar Inc., Peoria, IL (US)

( * ) Notice: Subject to any disclaimer, the term of this patent is extended or adjusted under 35 U.S.C. 154(b) by 526 days.

(21) Appl. No.: 12/412,849

(22) Filed: Mar. 27, 2009

(65) Prior Publication Data

US 2010/0243068 A1    Sep. 30, 2010

(51) Int. Cl.
*F15B 13/043* (2006.01)

(52) U.S. Cl. .......... 137/492; 137/625.6; 137/625.64; 251/29; 251/30.01; 251/31

(58) Field of Classification Search .......... 137/492, 137/625.6, 625.61, 625.63, 625.646; 251/29, 251/30.01, 31

See application file for complete search history.

(56) References Cited

U.S. PATENT DOCUMENTS

| | | | |
|---|---|---|---|
| 393,596 A | 11/1888 | Westinghouse, Jr. | |
| 3,033,171 A | 5/1962 | Engelbrecht et al. | |
| 3,106,224 A * | 10/1963 | Moss et al. | 137/625.63 |
| 3,253,516 A | 5/1966 | Huntington et al. | |
| 3,566,919 A * | 3/1971 | Vanderlaan | 137/625.63 |
| 3,568,718 A * | 3/1971 | Wilke et al. | 137/625.6 |
| 3,613,503 A | 10/1971 | Phillips | |
| 3,665,807 A * | 5/1972 | Bartholomaus et al. | 91/35 |
| 4,150,604 A | 4/1979 | Fuell | |
| 4,545,409 A * | 10/1985 | Luhmer | 137/625.64 |
| 4,586,187 A | 4/1986 | Hein et al. | |
| 4,683,915 A * | 8/1987 | Sloate | 137/625.63 |
| 4,779,648 A * | 10/1988 | Sloate | 137/625.64 |
| 5,129,229 A | 7/1992 | Nakamura et al. | |
| 5,261,234 A | 11/1993 | Holloway et al. | |
| 7,392,653 B2 | 7/2008 | Sugano | |
| 7,735,517 B2 * | 6/2010 | Kerckhove et al. | 137/625.63 |
| 2007/0204606 A1 | 9/2007 | Imanishi et al. | |
| 2008/0149181 A1 | 6/2008 | Kerckhove et al. | |

* cited by examiner

*Primary Examiner* — Craig Schneider
*Assistant Examiner* — William McCalister
(74) *Attorney, Agent, or Firm* — Leydig, Voit & Mayer

(57) ABSTRACT

A valve for controlling pressure in a system is provided. The valve includes a housing, a servo spool and a piston positioned within the housing with the piston and the servo spool being movable relative to each other. The piston defines a first orifice configured to communicate with a supply of pressurized fluid and a second orifice configured to communicate with a portion of the system exterior to the valve. A first chamber is arranged such that force due to fluid pressure in the first chamber is configured to move the piston in a first direction. The first chamber includes a third orifice configured to communicate with a controlled pressure in the system. A second chamber is at least partially defined by the housing and the piston and includes a fourth orifice configured to communicate with a low pressure fluid source. A biasing element is arranged in the second chamber. First and second fluid passages are provided in the servo spool and are configured such that in at least one relative position of the piston and the servo spool the first passage provides communication between the first orifice and the second orifice and in at least one other relative position the second passage provides communication between the second orifice and the fourth orifice.

17 Claims, 5 Drawing Sheets

SERVO PRESSURE CONTROL VALVE

TECHNICAL FIELD

This patent disclosure relates generally to a valve for controlling pressure in a system and, more particularly to a valve that controls pressure based on a pressure feedback.

BACKGROUND

Hydraulic systems may include one or more valves for controlling the flow of hydraulic fluid to one or more fluid-operated devices. For example, a machine may include one or more fluid-operated actuators that may be controlled by the hydraulic system for performing work. One way in which the operation of the valves in the hydraulic system can be controlled is based on the pressure in the one or more fluid operated devices, such as, for example hydraulic actuators. In particular, the opening and closing of the fluid passages by the valves may be selectively controlled to control the pressure in the hydraulic actuators.

Typically, the valves used for controlling the flow of hydraulic fluid in such hydraulic systems have an open loop configuration. This means that operation of the valve is controlled by inputting a setting to, for example, a biasing element such as a spring that acts on the valve. While such valves may be adequate for many applications, they may not be able to provide as precise of control in some applications, particularly those that involve a high flow or high pressure operating range. Additionally, the operation of such valves in these applications can become unstable further impairing the accuracy of the valves.

SUMMARY

The disclosure describes, in one aspect, a valve for controlling pressure in a system. The valve can include a housing, a servo spool and a piston positioned within the housing. The servo spool has at least a first passage and a second fluid passage therein. The piston at least partially surrounds the servo spool and the piston and the servo spool are movable relative to each other. The piston defines a first orifice configured to communicate with a supply of pressurized fluid and a second orifice configured to communicate with a portion of the system exterior to the valve. A first chamber is at least partially defined by the housing and the piston. The first chamber is arranged such that force due to fluid pressure in the first chamber is configured to move the piston in a first direction. The first chamber includes a third orifice configured to communicate with a controlled pressure in the system. A second chamber is at least partially defined by the housing and the piston and includes a fourth orifice configured to communicate with a low pressure fluid source. A biasing element is arranged in the second chamber. The second chamber and the biasing element are arranged such that a force produced by the biasing element is configured to move the piston in a second direction. The first and second fluid passages in the servo spool are configured such that in at least one relative position of the piston and the servo spool the first passage provides communication between the first orifice and the second orifice and in at least one other relative position the second passage provides communication between the second orifice and the fourth orifice.

In another aspect, the disclosure describes a hydraulic system. The hydraulic system includes a fluid pump configured to pressurize fluid in the hydraulic system, a low pressure fluid source, a fluid operated actuator and a metering element for controlling the flow of fluid with respect to the actuator through an orifice in the actuator. The metering element is switchable in response to a control pressure in a control chamber between an open state in which the actuator orifice is in communication with one of the fluid pump or the low pressure fluid source and a closed state in which the actuator orifice is not in fluid communication with the one of the fluid pump or the low pressure fluid source. A valve is configured to switch the metering element between the open and closed states to control pressure in the actuator including. The valve can include a housing, a servo spool and a piston positioned within the housing. The servo spool has at least a first fluid passage and a second fluid passage therein. The piston at least partially surrounds the servo spool and the piston and the servo spool are movable relative to each other. The piston defines a first orifice configured to communicate with the fluid pump and a second orifice configured to communicate with the control chamber of the metering element. A first chamber is at least partially defined by the housing and the piston. The first chamber is arranged such that force due to fluid pressure in the first chamber is configured to move the piston in a first direction. The first chamber includes a third orifice configured to communicate with the pressure in the actuator. A second chamber is at least partially defined by the housing and the piston and includes a fourth orifice configured to communicate with the low pressure fluid source. A biasing element is arranged in the second chamber. The second chamber and the biasing element are arranged such that a force produced by the biasing element is configured to move the piston in a second direction. The first and second fluid passages in the servo spool are configured such that in at least one relative position of the piston and the servo spool the first passage provides communication between the first orifice and the second orifice and in at least one other relative position the second passage provides communication between the second orifice and the fourth orifice.

According to another aspect, the disclosure describes a method for controlling pressure in an actuator. The method including the step of controlling the flow of fluid with respect to the actuator with a metering element that is switchable in response to a control pressure in a control chamber between an open state in which the actuator is in communication with a fluid source and a closed state in which the actuator not in communication with the fluid source. In the method, the metering element is switch between the open and closed states using a valve. The valve includes a housing, a servo spool and a piston positioned within the housing. The servo spool has at least a first fluid passage and a second fluid passage therein. The piston at least partially surrounds the servo spool. The piston and the servo spool are movable relative to each other. The piston defines a first orifice configured to communicate with a high pressure fluid source and a second orifice configured to communicate the control chamber of the metering element. According to the method, back pressure from the actuator is fed to a first chamber of the valve. The first chamber is arranged such that force due to fluid pressure in the first chamber is configured to move the piston in a first direction and is in communication with the pressure in the actuator. A biasing element is provided in a second chamber of the valve. The second chamber and the biasing element are arranged such that a force produced by the biasing element is configured to move the piston in a second direction. The first and second fluid passages in the servo spool are configured such that in at least one relative position of the piston and the servo spool the first passage provides communication between the first orifice and the second orifice and in at least one other relative position the second passage provides communication between the second orifice and the fourth orifice.

DETAILED DESCRIPTION

Figure 1:
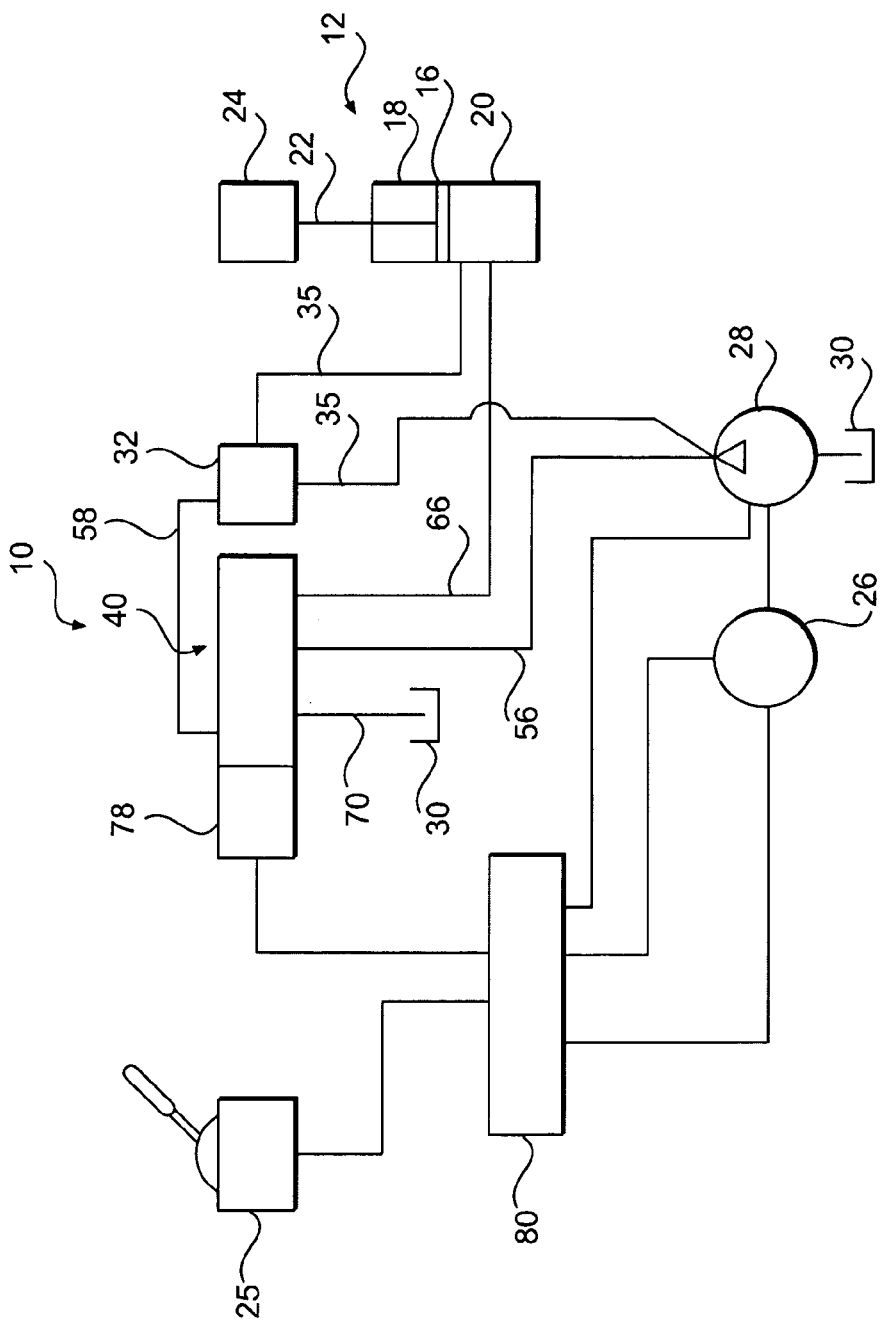
FIG. 1 is a schematic block diagram of a hydraulic system of a machine using a valve for controlling pressure according to the disclosure.

This disclosure relates to a valve that may be used to control pressure in at least one component of a hydraulic system. FIG. 1 of the drawings shows an exemplary embodiment of a hydraulic system 10 that may be incorporated into a machine having one or more work implements operable via at least one fluid operated actuator 12. The actuator 12 may include a cylinder 14 and a piston 16 with the piston 16 defining a rod chamber 18 and a head chamber 20. The piston 16 may be coupled to a rod 22 that is coupled to a load 24, for example, a boom or bucket of a machine configured to perform work. According to some embodiments, the actuator 12 may be a hydraulic motor or any other hydraulic actuator known to a person having skill in the art. A control device 25 can be configured to control operation of the actuator 12.

According to some embodiments, the hydraulic system 10 may include a power source 26, such as an internal combustion engine (e.g., a compression-ignition engine, a spark-ignition engine, or a gas turbine engine), or a motor (e.g., an electric motor) that can supply power to one or more components of the system 10. The power source 26 may be configured, for example, to provide power to a pump 28. In the illustrated hydraulic system, the pump 28 is configured to draw fluid from a low-pressure fluid source such as a tank 30, which serves as a reservoir for the system 10, and pump the fluid under pressure to various portions of system 10. The pump 28 may be a fixed-displacement pump or a variable-displacement pump.

Figure 2:
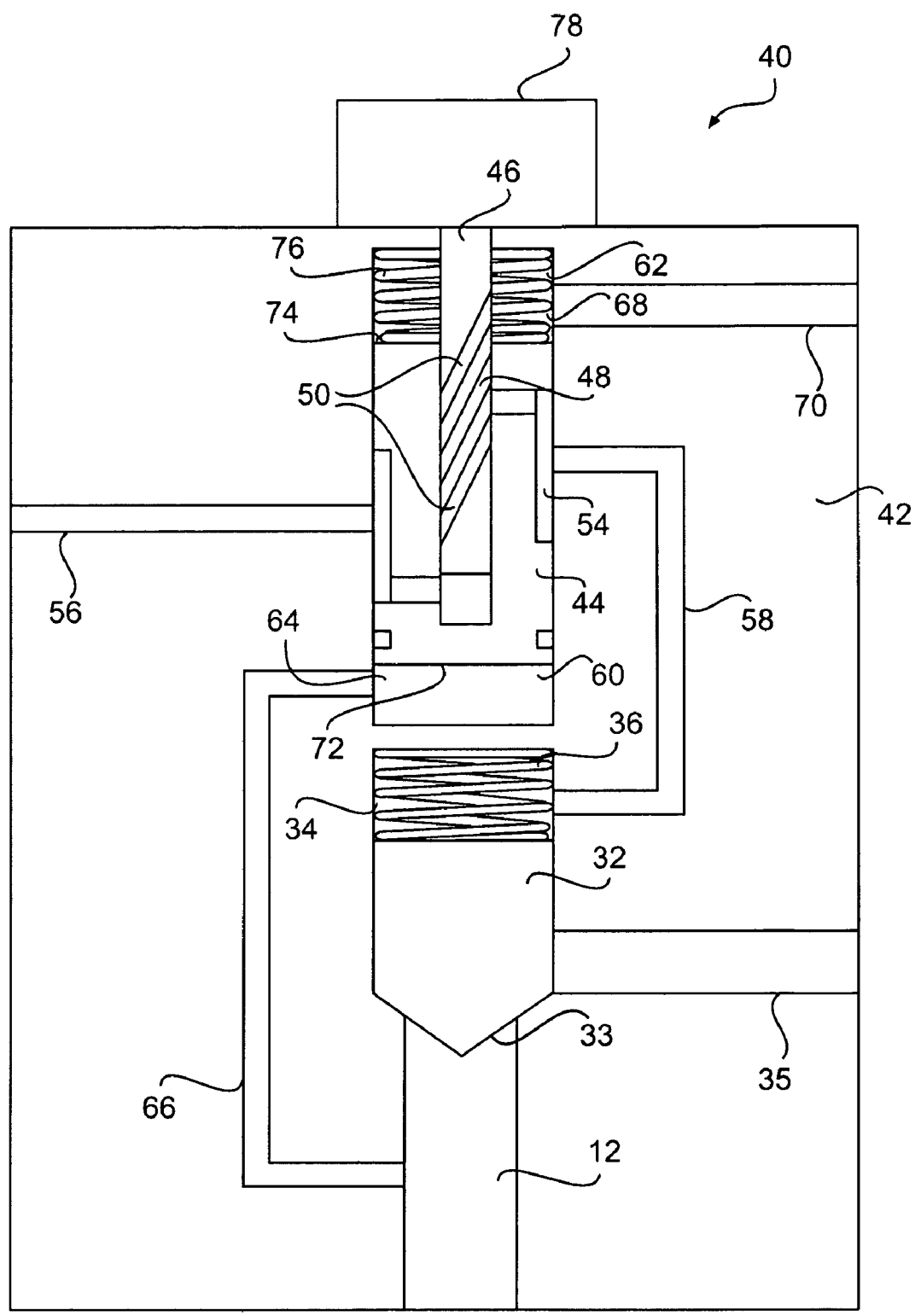
FIG. 2 is a schematic side sectional view of a valve for controlling pressure according to the disclosure.

For controlling the flow of fluid to and/or from the actuator 12, such as through an orifice 33 in the actuator, the illustrated hydraulic system 10 further includes a metering element 32. In particular, the metering element 32 may be configured to control the flow of fluid into and/or from the rod chamber 18 and/or the head chamber 20 of the actuator 12, such that the rod 22 extends from or retracts into the actuator 12. In the embodiment of FIG. 2, the metering element 32 is a poppet valve, although of course other types of valves could be used. The metering element 32 of FIG. 2 is switchable in response to a control pressure in a control chamber 34 between an open position or state and a closed position or state. In the open position or state, the actuator orifice 33 is open such that a line 35 extending to the pump 28 is in communication with the interior of the actuator 12 so that pressurized fluid from the pump 28 can be introduced into the actuator 12. In the closed position, the metering element 32 blocks fluid communication between the pump 28 and the actuator 12 through the actuator orifice 33. In the illustrated embodiment, the control chamber 34 backs the metering element 32 and further includes a biasing element 36, such as a spring, that helps control movement of the metering element 32 between the open and closed positions.

The illustrated hydraulic system 10 further includes a valve 40 that can be used to control pressure in at least one component of the hydraulic system 10. In the illustrated embodiment, the valve 40 can be used to control the pressure in one or more chambers of the actuator 12 by controlling operation of the metering element 32. Referring to FIG. 2, the illustrated valve 40 includes a housing 42 that at least partially houses a piston 44 and a servo spool 46 with the piston 44 arranged in at least partially surrounding relation to the servo spool 46. The piston 44 and servo spool 46 are configured such that they are moveable relative to each other. In the case of the FIG. 2 embodiment, the servo spool 46 is rotatable relative to the piston 44 and the piston 44 is linearly translatable relative to the servo spool 46. More specifically with respect to movement of the piston 44, the piston 44 is configured to translate in a linear direction within the housing 42, and relative to the servo spool 46, in first and second directions, i.e. in a first upward direction and a second downward direction in the embodiments illustrated in FIGS. 2-5.

The servo spool 46 is configured such that at least first and second fluid passages 48, 50 are provided therein. In the embodiment of FIG. 2, the servo spool 46 has one or more spiral grooves in the surface of the servo spool separated by spiral lands. The spiral grooves define in this case the first and second fluid passages 48, 50 through the servo spool 46. The piston 44 can also be configured so as to define at least first and second orifices 52, 54 therein with the first orifice 52 providing fluid communication with a supply of pressurized fluid and the second orifice 54 providing fluid communication with a portion of the hydraulic system exterior to the valve. In the valve 40 of FIG. 2, the first orifice 52 communicates with a line 56 extending to the pump 28 and the second orifice 54 communicates with a line 58 extending to the control chamber 34 of the metering element 32.

The servo spool 46, piston 44, and housing 42 define a first chamber 60 and a second chamber 62 (e.g., an annular chamber) located at opposite ends of the piston 44. The first chamber 60 is in fluid communication with a third orifice 64 configured to communicate with a controlled pressure in the system 10. In the illustrated embodiments, the third orifice 64 connects to a line 66 extending between the first chamber 60 and the interior of the actuator 12 such that the first chamber 60 is in fluid communication with the pressurized fluid in the interior of the actuator 12. The second chamber 62 includes a fourth orifice 68 configured to communicate with a low-pressure fluid source. In the embodiment of FIG. 2, the fourth orifice 68 connects to a line 70 to the tank 30.

Fluid pressure in the first chamber 60 acts on a first end surface 72 of the piston 44, and fluid pressure in the second chamber 62 acts on an opposing second end surface 74 of the piston 44, such that the forces applied to the two surfaces of the piston tend to oppose one another. The piston 44 and housing 42 are configured such that force due to fluid pressure in the first chamber 60 moves the piston 44 in the first (upward in the drawings) direction. A biasing element 76, such as a spring, is arranged in the second chamber 62 in surrounding relation to the spool 46. The biasing element 76 extends between the housing 42 and the second end surface 74 of the piston 44 and is configured to produce a force that moves the piston 44 in the second (downward in the drawing) direction within the housing 42.

The first and second fluid passages 48, 50 in the servo spool 46 are configured such that in at least one relative position, e.g. a first relative position, of the servo spool 46 and piston 44, the first fluid passage 48 provides communication between the first orifice 52 and the second orifice 54. Additionally, the first and second fluid passages 48, 50 in the servo spool 46 are configured such that in at least one other relative position, e.g. a second relative position, of the piston 44 and the servo spool 46 the second passage 50 provides communication between the second and fourth orifices 54, 68.

In terms of the embodiment of FIG. 2, in the first relative position of the servo spool 46 and piston 44, pressurized fluid from the pump 28 is directed through the first fluid passage 48 in the spool 46 through the second orifice 54 in the piston 44 and through the line 58 extending to the control chamber 34 in the metering element 32. In this case, the pressurized fluid, combined with the force of the poppet biasing element 36, holds the metering element 32 in the closed position, closing the line 35 from the line extending from the pump 28 to the actuator 12. In the second relative position of the servo spool 46 and the piston 44, the second orifice 54 and the line 58 extending to the control chamber 34 of the metering element 32 is in fluid communication with the tank 30 through the second fluid passage 50 in the servo spool 46 and the fourth orifice 68. This opens a drain path for the pressure in the control chamber 34 which allows the metering element 32 to move into the open position opening the line 35 from the pump 28 to the actuator 12 and allowing pressurized fluid from the pump into the actuator. The drain path for the control chamber 34 of the metering element 32 extends through the line 58 from the piston 44 to the control chamber 34, the second orifice 54 in the piston 44, through the second chamber 62 above the piston and out to the tank 30 through the fourth orifice 68.

The servo spool 46 of the embodiment of FIG. 2 may be operably coupled to a rotary actuator such as a motor 78, for example, a step motor, via a coupling (e.g., an elastic coupling), such that the servo spool 46 may be rotated through an angular displacement within the piston 44 via the motor 78. For example, the servo spool 46 may include an input shaft, and the motor 78 may include an output shaft, and the input shaft of the servo spool 46 may be coupled directly to the output shaft of the motor 78 via the coupling. According to some embodiments (not shown) a gear assembly, for example, a reduction gear assembly, may be provided between the motor 78 and the servo spool 46. According to some embodiments, the motor 78 may be a step motor. For example, the step motor may be configured to operate such that the amount of rotation of output shaft occurs in finite increments, thereby rotating servo spool 46 in corresponding finite increments of angular displacement.

According to some embodiments, the hydraulic system 10 may include a controller 80 configured to at least partially control operation of the system 10 according to operation of the control device 25. For example, the controller 80 may include electronic circuits and/or hydro-mechanical circuits for controlling fluid flow in the system 10. As shown in FIG. 1, the controller 80 may be operably coupled to one or more of the control device 25, the power source 26, the pump 28, and/or the valve motor 78, such that the actuator 12 responds according to an operator's input from the control device 25.

The disclosed valve 40 is able to control pressure in a component of the system 10 because the piston 44 of the valve 40 is exposed to the pressure that the valve 40 is controlling, in this case the pressure in the actuator 12. This converts the controlled pressure to a displacement of the piston 44. Thus, the position of the piston 44 is a function of the controlled pressure. This allows the valve 40 to be used to provide a closed loop system in which it automatically adjusts based on pressure feedback from, in this instance, the actuator 12. For example, during exemplary operation, when the servo spool 46 and piston 44 are in a neutral position (i.e., a position resulting in no movement of piston and/or main spool), spiral lands on the servo spool and cover the first and second orifices 52, 54 in the piston 44. In the neutral position, for example, the force acting on the surface of piston 44 due to the pressure in first chamber 60 is substantially equal to the force acting on surface of piston 44 due to the pressure and the force applied by the biasing element 76 in second chamber 62.

If, for example, an operator desires to change the pressure in the actuator 12 such as to operate a work implement, he can enter an input through the control device 25. This can send a signal to the controller 80, which, in turn, sends a signal to the valve motor 78 to turn the servo spool 46 relative to the piston 44. If the signal is to increase the pressure in the actuator 12, the valve motor 78 rotates the servo spool 46 into a position in which the second (spiral groove) fluid passage 50 in the servo spool 46 communicates at one end with the second piston orifice 54 communicating with the control chamber 34 of the metering element 32 and at the other end with the second chamber 62. In this rotary position of the servo spool 46, the first (spiral groove) fluid passage 48 in the servo spool 46 is blocked. The opening of the second fluid passage 50 in the servo spool 46 opens the drain path for the control chamber 34 of the metering element 32 allowing pressure in the control chamber 34 to bleed off through the line 58, the second fluid passage 50 in the servo spool 46, the second chamber 62 and out to the tank 30 through the fourth orifice 68. This causes the metering element 32 to open allowing pressurized fluid from the pump 28 into the actuator 12 through the line 35 thereby increasing the pressure in the actuator.

When the actuator 12 reaches the desired pressure level, the pressure in the first chamber 60 becomes greater than the force applied by the tank pressure and biasing element 76 in the second chamber. This causes the piston 44 to translate within the housing 42 and relative to the servo spool 46 (in an upward direction relative to the illustrated embodiment) until the piston 44 and servo spool 46 reach a position in which the first (spiral groove) fluid passage 48 in the servo spool 46 aligns with the first and second piston orifices 52, 54. This opens a fluid path from the line 56 to the pump 28 to the line 58 to the control chamber 34 of the metering element 32 increasing the pressure in the control chamber 34 and moving the metering element 32 to the closed position. This closes the line 35 from the pump 28 to the actuator 12.

A change in pressure in the actuator 12 will result in a change in the position of the piston 44 in the housing 42 and relative to the servo spool 46 due to the fluid communication between the first chamber 60 and the actuator 12. This will either reopen the first fluid passage 48 of the servo spool 46 to the pump 28 if the pressure in the actuator 12 exceeds the desired level causing the metering element 32 to close blocking the line 35 from the pump 28 to the actuator 12 or will reopen the second fluid passage 50 of the servo spool 46 to the tank 30 if the pressure in the actuator 12 drops below a desired level causing the metering element 32 to open thereby opening the line 35 from the pump 28 to the actuator 12. As will be appreciated by those skilled in the art, the valve 40 can be configured such that changes in the relative position of the servo spool 46 and the piston 44 are directly proportional to the pressure setting of the valve 40. Moreover, since it can be configured to provide a closed loop system, the disclosed valve 40 can provide more precise control in applications, such as implement control, involving high flow or high pressure operating ranges as compared to control valves without any feedback.

Figure 3:
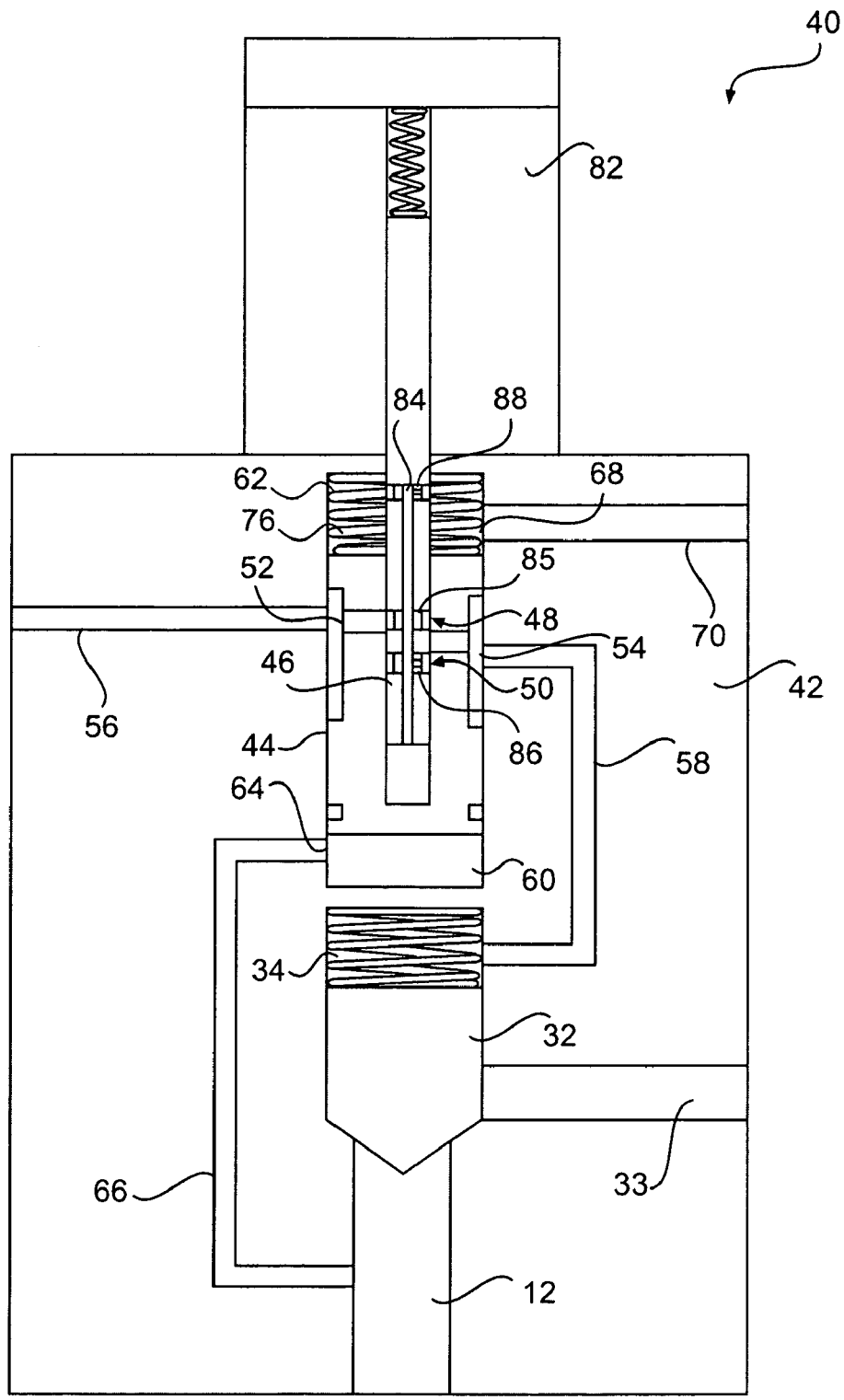
FIG. 3 is a schematic side sectional view of a valve for controlling pressure according to another exemplary disclosed embodiment.

Another exemplary embodiment of a valve 40 for controlling pressure is shown in FIG. 3. This embodiment is generally similar to the embodiment of FIG. 2 and for ease of reference the same reference numbers are used in FIG. 3 for components that are the same as those in the FIG. 2 embodiment. The primary difference in the embodiment of FIG. 3 is that the servo spool 46 is adapted to move in a linear direction relative to the piston 44 as opposed to the rotary movement of the servo spool of the FIG. 2 embodiment. Additionally, instead of a motor, the servo spool of FIG. 3 is moved in and out relative to the piston via a push-pull type actuator, such as a solenoid 82 as shown in FIG. 3.

As with the embodiment of FIG. 2, the servo spool 46 of FIG. 3 is configured with at least first and second fluid passages 48, 50 therein. Moreover, the servo spool 46 and piston 44 are configured such that in at least one relative position of the piston 44 and the servo spool 46 the first passage 48 provides communication between the first orifice 52 and the second orifice 54 connecting the control chamber 34 of the metering element 32 to the pump 28 and in at least one other relative position the second passage 50 provides communication between the second orifice 54 and the fourth orifice 68 connecting the control chamber 34 to the tank 30.

In this case, the servo spool 46 includes a longitudinal passage 84 extending the length of the spool and first, second and third lateral passages 85, 86, 88 that communicate with the longitudinal passage 84. The first, second and third lateral passages 85, 86, 88 are longitudinally spaced from each other on the servo spool 46 with the first lateral passage 85 together with the longitudinal passage 84 defining the first fluid passage 48 through the servo spool 46 and the second and third lateral passages 86, 88 together with the longitudinal passage 84 defining the second fluid passage 50. The first and second lateral passages 85, 86 are configured and longitudinally spaced such that in one relative position of the servo spool 46 and piston 44 the first lateral passage 85 aligns with both the first and second orifices 52, 54 in the piston 44. In this position, the line 56 to the pump 28 is in communication with the line 58 to the control chamber 34 of the metering element 32 and the second fluid passage 50 to the tank 30 is closed or blocked.

Additionally, in a second relative position of the servo spool 46 and piston 44, the second lateral passage 86 aligns with the second piston orifice 54. In this position, the second fluid passage 50 through the servo spool 46 is open allowing pressure from the control chamber 34 to bleed through the second lateral passage 86, the longitudinal passage 84 and through the third lateral passage 88 and into the second chamber 62. From the second chamber 62, the pressurized fluid can exit through the fourth orifice 68 to the tank 30. In this second relative position, the first fluid passage 48 through the servo spool 46 is closed or blocked. Apart from the difference in the configuration of the servo spool 46 and its push-pull actuation, the valve 40 of FIG. 3 otherwise operates the same as the valve disclosed in FIG. 2.

Figure 4:
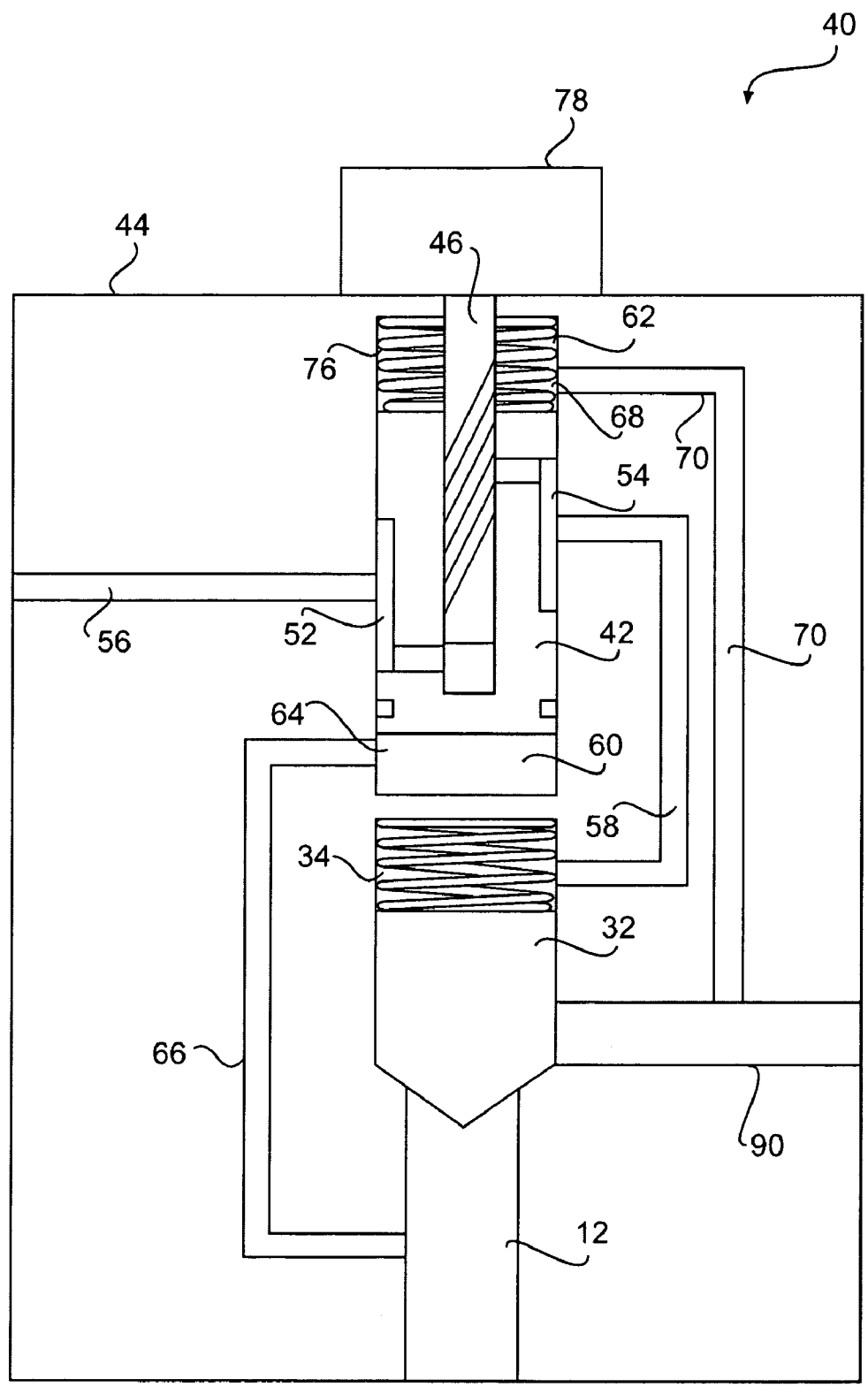
FIG. 4 is a schematic side sectional view of a valve for controlling pressure according to another exemplary disclosed embodiment.
Figure 5:
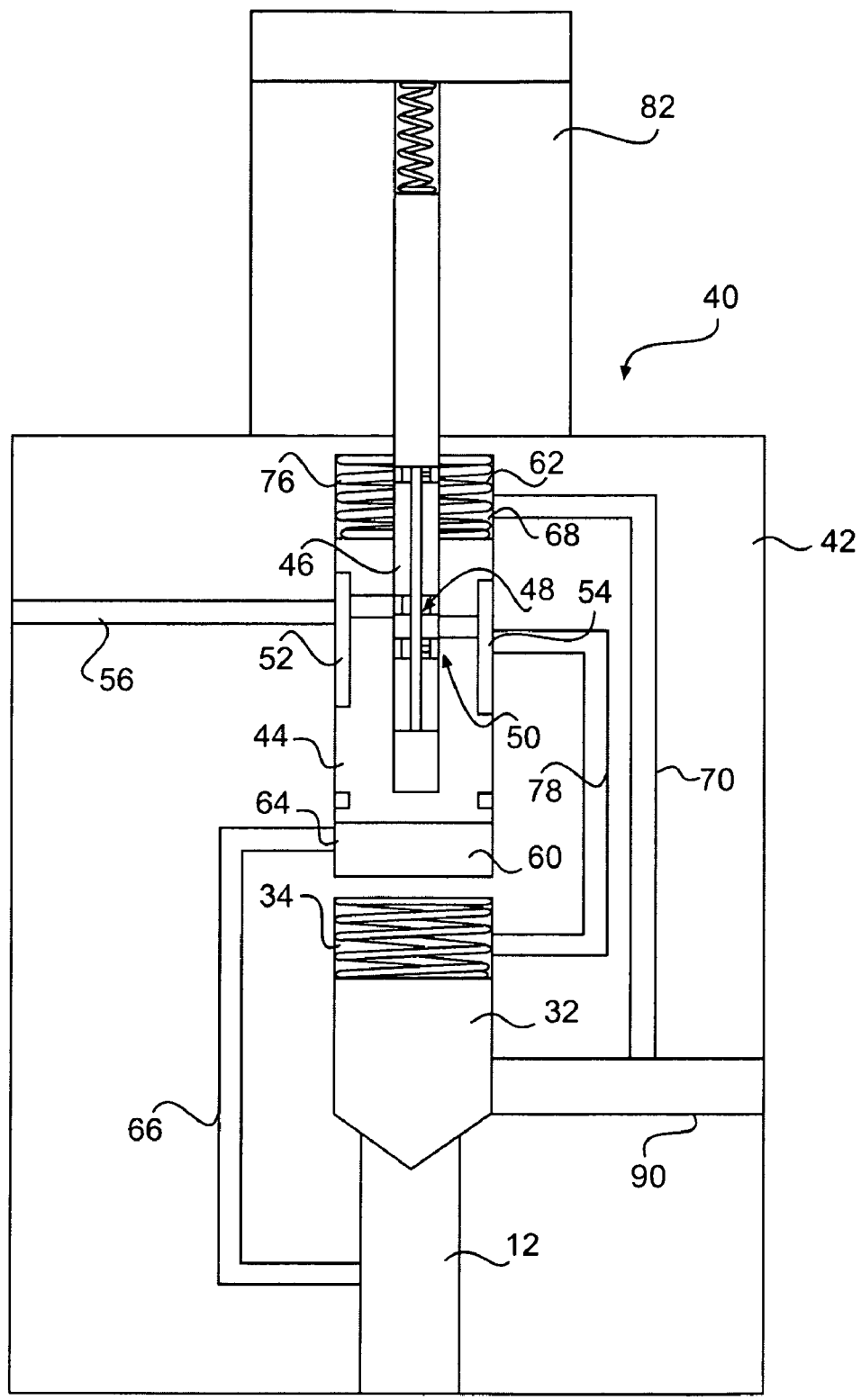
FIG. 5 is a schematic side sectional view of a valve for controlling pressure according to another exemplary disclosed embodiment.

FIGS. 4 and 5 illustrate alternative embodiments showing how the valves 40 of FIGS. 2 and 3 can be configured to control the flow of pressurized fluid from the actuator 12 to the tank 30, instead of the flow of pressurized fluid from the pump 28 to the actuator 12. The valve 40 of FIG. 4 is the same as that of FIG. 2 except that opening and closing of the metering element 32 opens and closes a line 90 extending from the actuator 12 to the tank 30. In this case, the line 70 to the tank 30 extending from the fourth orifice 68 ties into the line 90 from the actuator 12 to the tank 30. Similarly, the valve 40 of FIG. 5 is the same as that of FIG. 3 except that opening and closing of the metering element 32 opens and closes a line 90 extending from the actuator 12 to the tank 30. The arrangements of FIGS. 4 and 5 operate in generally the same manner as the embodiment of FIG. 2 except that the valve 40 can be used to control lowering of the pressure in the actuator 12 by opening and closing the line 90 extending to the tank 30.

INDUSTRIAL APPLICABILITY

The disclosed exemplary valves may be applicable for any type of machine including a hydraulic system configured to control fluid flow. For example, the disclosed exemplary valves may be used in association with a machine including a hydraulic system having one or more hydraulic actuators configured to perform work. Some examples of hydraulic actuators include, but are not limited to, linear actuators, such as, for example, rod and cylinder actuators, and rotary actuators, such as, for example, hydraulic pumps and hydraulic motors. Some examples of machines that may include such actuators include, but are not limited to, construction machines and agricultural machines. Such machines may include, but are not limited to, tracked machines and wheeled machines, for example, machines having work implements configured to perform a work function, such as, for example, digging, pushing, scraping, lifting, dumping, and/or hoisting. Such functions may be controlled, for example, by controlling fluid flow to and/or from hydraulic actuators. Fluid flow may be controlled, at least in part, by one or more of the exemplary valves disclosed herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A valve for controlling pressure in a system comprising:
    a housing;
    a servo spool positioned within the housing, the servo spool having at least a first fluid passage and a second fluid passage therein;
    a piston positioned within the housing and at least partially surrounding the servo spool, the piston and the servo spool being movable relative to each other, the piston defining a first orifice configured to communicate with a supply of pressurized fluid and a second orifice configured to communicate with a portion of the system;

a first chamber at least partially defined by the housing and the piston, the first chamber being arranged such that force due to fluid pressure in the first chamber is configured to move the piston in a first direction, the first chamber including a third orifice configured to communicate with a controlled pressure in the system;

a second chamber at least partially defined by the housing and the piston and including a fourth orifice configured to communicate with a low pressure fluid source; and a biasing element arranged in the second chamber, the second chamber and the biasing element being arranged such that a force produced by the biasing element is configured to move the piston in a second direction;

wherein the first and second fluid passages in the servo spool are configured such that in at least one relative position of the piston and the servo spool the first fluid passage provides communication between the first orifice and the second orifice and in at least one other relative position the second fluid passage provides communication between the second orifice and the fourth orifice.

2. The valve of claim 1 further including an actuator for moving the servo spool relative to the piston.

3. The valve of claim 2 wherein the actuator is a rotary actuator.

4. The valve of claim 2 wherein the actuator is a push-pull actuator.

5. The valve of claim 1 wherein the servo spool is rotatable relative to the piston.

6. The valve of claim 1 wherein the servo spool is linear translatable relative to the piston.

7. The valve of claim 1 wherein the first and second fluid passages are at least partially defined by a plurality of spiral grooves in a surface of the servo spool.

8. The valve of claim 1 wherein the first and second fluid passages are defined by a longitudinal passage in the servo spool and a plurality of longitudinally spaced passages in the servo spool.

9. A hydraulic system comprising:

a fluid pump configured to pressurize fluid in the hydraulic system;

a low pressure fluid source;

a fluid operated actuator;

a metering element for controlling the flow of fluid with respect to the actuator through an orifice in the actuator, the metering element being switchable in response to a control pressure in a control chamber between an open state in which the actuator orifice is in communication with one of the fluid pump or the low pressure fluid source and a closed state in which the actuator orifice is not in fluid communication with the one of the fluid pump or the low pressure fluid source;

a valve configured to switch the metering element between the open and closed states to control pressure in the actuator including:

a housing;

a servo spool positioned within the housing, the servo spool having at least a first fluid passage and a second fluid passage therein;

a piston positioned within the housing and at least partially surrounding the servo spool, the piston and the servo spool being movable relative to each other, the piston defining a first orifice configured to communicate with the fluid pump and a second orifice configured to communicate the control chamber of the metering element;

a first chamber at least partially defined by the housing and the piston, the first chamber being arranged such that force due to fluid pressure in the first chamber is configured to move the piston in a first direction, the first chamber including a third orifice configured to communicate with the pressure in the actuator;

a second chamber at least partially defined by the housing and the piston and including a fourth orifice configured to communicate with the low pressure fluid source; and a biasing element arranged in the second chamber, the second chamber and the biasing element being arranged such that a force produced by the biasing element is configured to move the piston in a second direction;

wherein the first and second fluid passages in the servo spool are configured such that in at least one relative position of the piston and the servo spool the first fluid passage provides communication between the first orifice and the second orifice and in at least one other relative position the second fluid passage provides communication between the second orifice and the fourth orifice.

10. The hydraulic system of claim 9 wherein the valve further includes an actuator for moving the servo spool relative to the piston.

11. The hydraulic system of claim 10 wherein the actuator is a rotary actuator.

12. The hydraulic system of claim 10 wherein the actuator is a push-pull actuator.

13. The hydraulic system of claim 9 wherein the servo spool is rotatable relative to the piston.

14. The hydraulic system of claim 9 wherein the servo spool is linear translatable relative to the piston.

15. The hydraulic system of claim 9 wherein the first and second fluid passages of the valve are at least partially defined by a plurality of spiral grooves in a surface of the servo spool.

16. The hydraulic system of claim 9 wherein the first and second fluid passages of the valve are defined by a longitudinal passage in the servo spool and a plurality of longitudinally spaced passages in the servo spool.

17. The hydraulic system of claim 9 wherein the low pressure fluid source is a tank.

* * * * *